US006987756B1

(12) United States Patent
Ravindranath et al.

(10) Patent No.: US 6,987,756 B1
(45) Date of Patent: Jan. 17, 2006

(54) MULTI-MODE ENDPOINT IN A COMMUNICATION NETWORK SYSTEM AND METHODS THEREOF

(75) Inventors: Ravi Anant Ravindranath, Milpitas, CA (US); Eddie Tan-atichat, Fremont, CA (US); Sreedhara Baithadka, Sunnyvale, CA (US); William P. Korbe, Milpitas, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/414,762

(22) Filed: Oct. 7, 1999

(51) Int. Cl.
*H04L 12/66* (2006.01)
*H04L 12/56* (2006.01)

(52) U.S. Cl. ..................................... 370/352; 370/401
(58) Field of Classification Search ................ 370/352, 370/401, 260, 271; 379/215.01, 207.01
See application file for complete search history.

(56) References Cited

U.S. PATENT DOCUMENTS

| | | | |
|---|---|---|---|
| 5,761,294 | A | 6/1998 | Shaffer et al. |
| 5,867,495 | A | 2/1999 | Elliott et al. |
| 5,892,764 | A | 4/1999 | Riemann et al. |
| 5,940,479 | A | 8/1999 | Guy et al. |
| 5,943,395 | A | 8/1999 | Hansen |
| 5,949,765 | A * | 9/1999 | Deadman et al. ........... 370/271 |
| 5,970,065 | A | 10/1999 | Miloslavsky |
| 6,021,428 | A | 2/2000 | Miloslavsky |
| 6,049,531 | A * | 4/2000 | Roy ..................... 370/395.53 |
| 6,310,873 | B1 * | 10/2001 | Rainis et al. ............... 370/356 |
| 6,370,149 | B1 * | 4/2002 | Gorman et al. ............ 370/419 |
| 6,418,205 | B2 * | 7/2002 | Capers et al. .......... 379/112.01 |

FOREIGN PATENT DOCUMENTS

| EP | 0 758 175 A1 | 2/1997 |
|---|---|---|
| EP | 0 808 048 A2 | 11/1997 |

OTHER PUBLICATIONS

Salman, et al.; The Future of IP-PSTN Interworking: Aug. 24, 199, 38th European Telecommunications Congress Proceedings Netorkin the Future. Utrecht, NL, Aug. 24-28, 1999, London: IBTE, GB, pp. 163-167, XP000847190.
Tricht, et al., "Vocie-Over-IP for Corporate Users. A Solution in Search of a Problem?", Aug. 24, 1999, 38th European Telecommunications Congress Proceedings Netorkin the Future. Utrecht, NL, Aug. 24-28, 1999, London: IBTE, GB , pp. 9-14, XP000847162.

* cited by examiner

*Primary Examiner*—Hassan Kizou
*Assistant Examiner*—Hong Sol Cho
(74) *Attorney, Agent, or Firm*—Blakely Sokoloff Taylor & Zafman, LLP

(57) ABSTRACT

A method, apparatus, and communication network system that allows an endpoint to be simultaneously registered with more than one communications server is described. In one embodiment, the communication network system includes a network, a plurality of communications servers that are coupled to the network, and a plurality of endpoints coupled to the network. Each endpoint is capable of being simultaneously registered with more than one communications server. A communication method for an endpoint involves registering a first logical line of the endpoint with a first communications server, and registering a second logical line of the endpoint with a second communications server. Consequently, flexibility is obtained by allowing an endpoint to choose the registering communications server for each logical line of the endpoint.

19 Claims, 10 Drawing Sheets

| TELEPHONE NUMBER, LOGICAL LINE NUMBER OF ENDPOINT | IP, MAC ADD OF TERMINAL GATEWAY OR ENDPOINT | IP, MAC ADD OF REGISTERED SERVER | PROTOCOLS | FEATURES | E-MAIL ADDRESS | MISC. |
|---|---|---|---|---|---|---|
| | | | ... | | | |
| | | | | | | |
| | | | | | | |

*FIG. 1A*

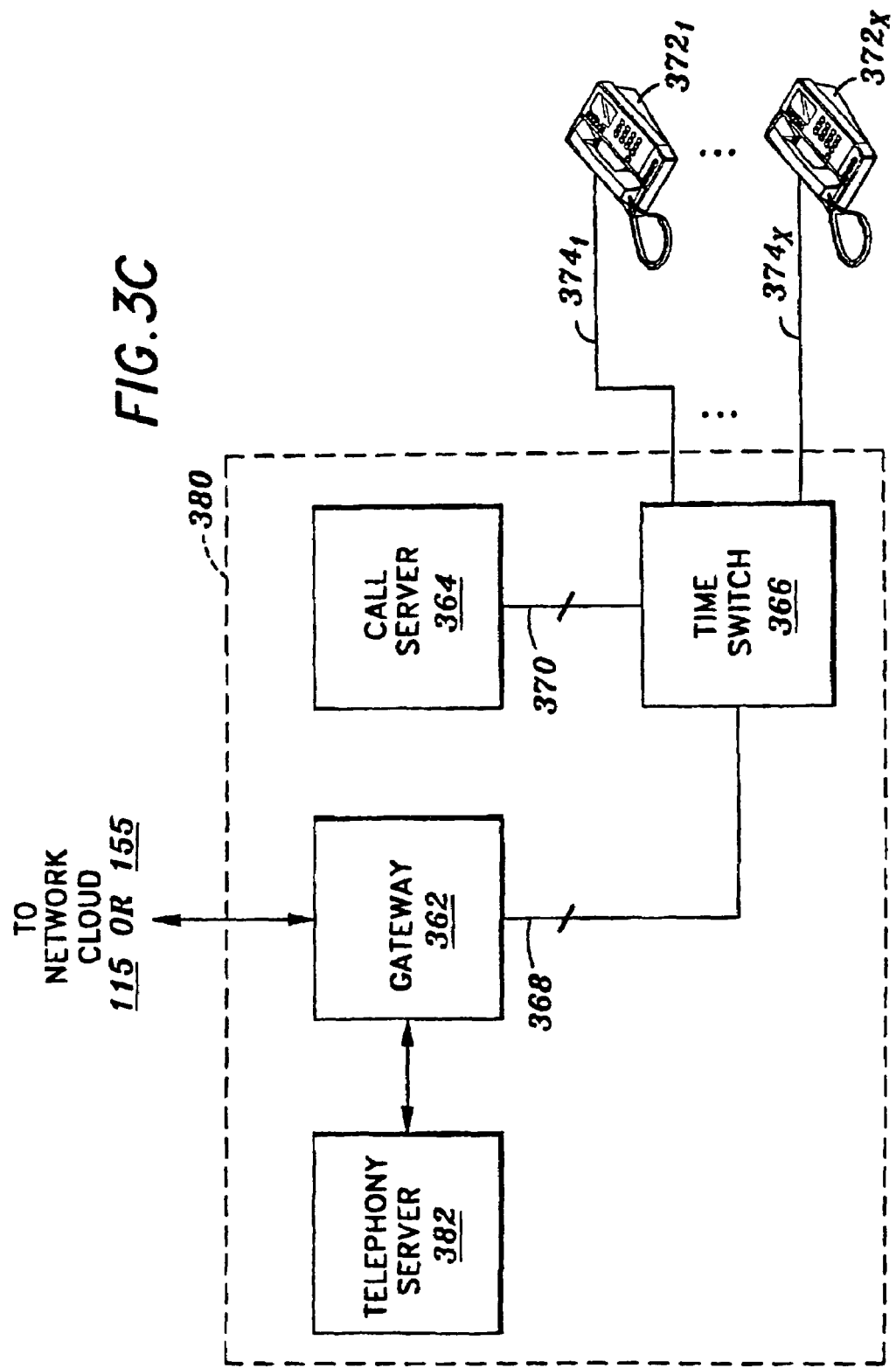

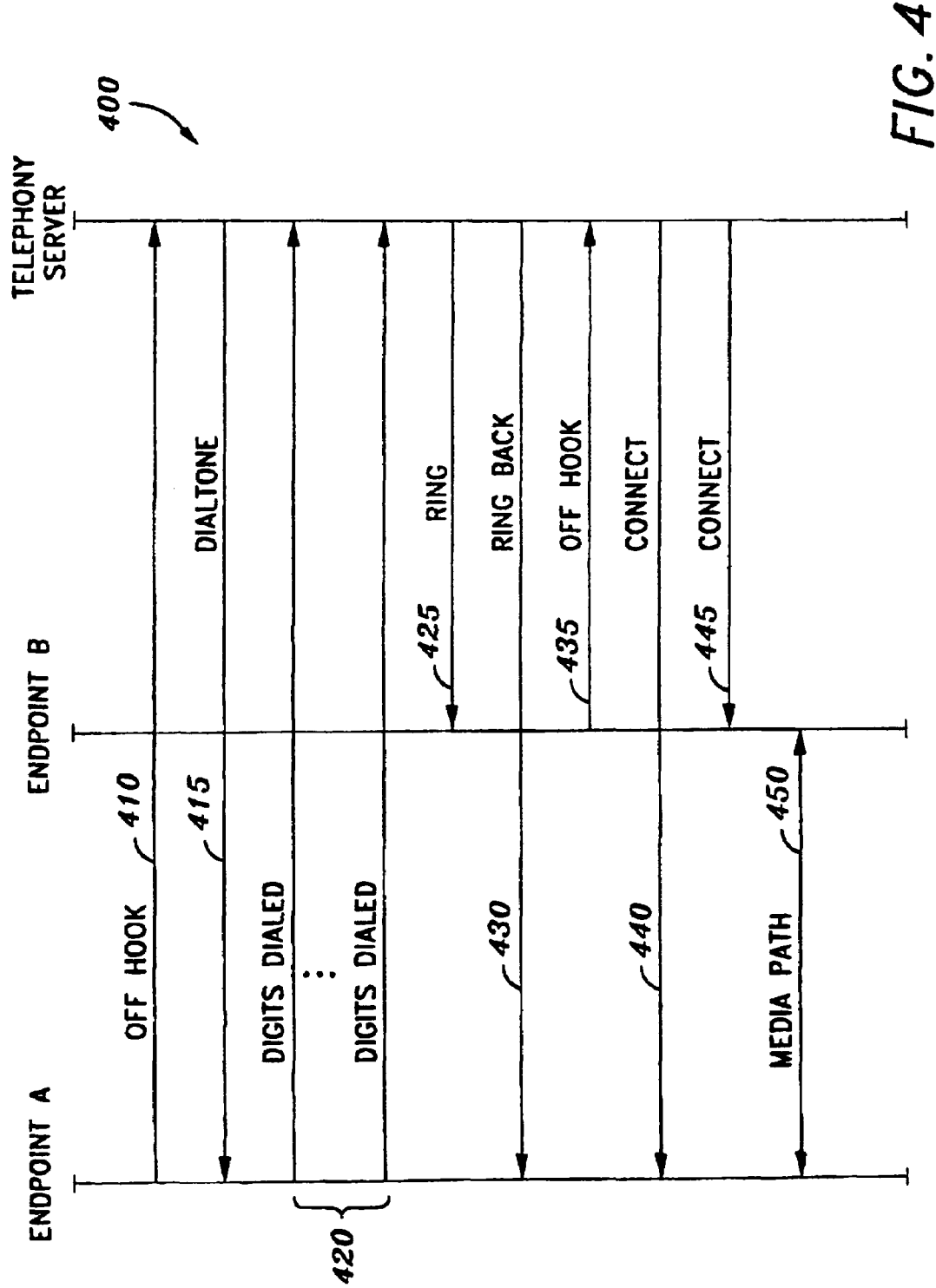

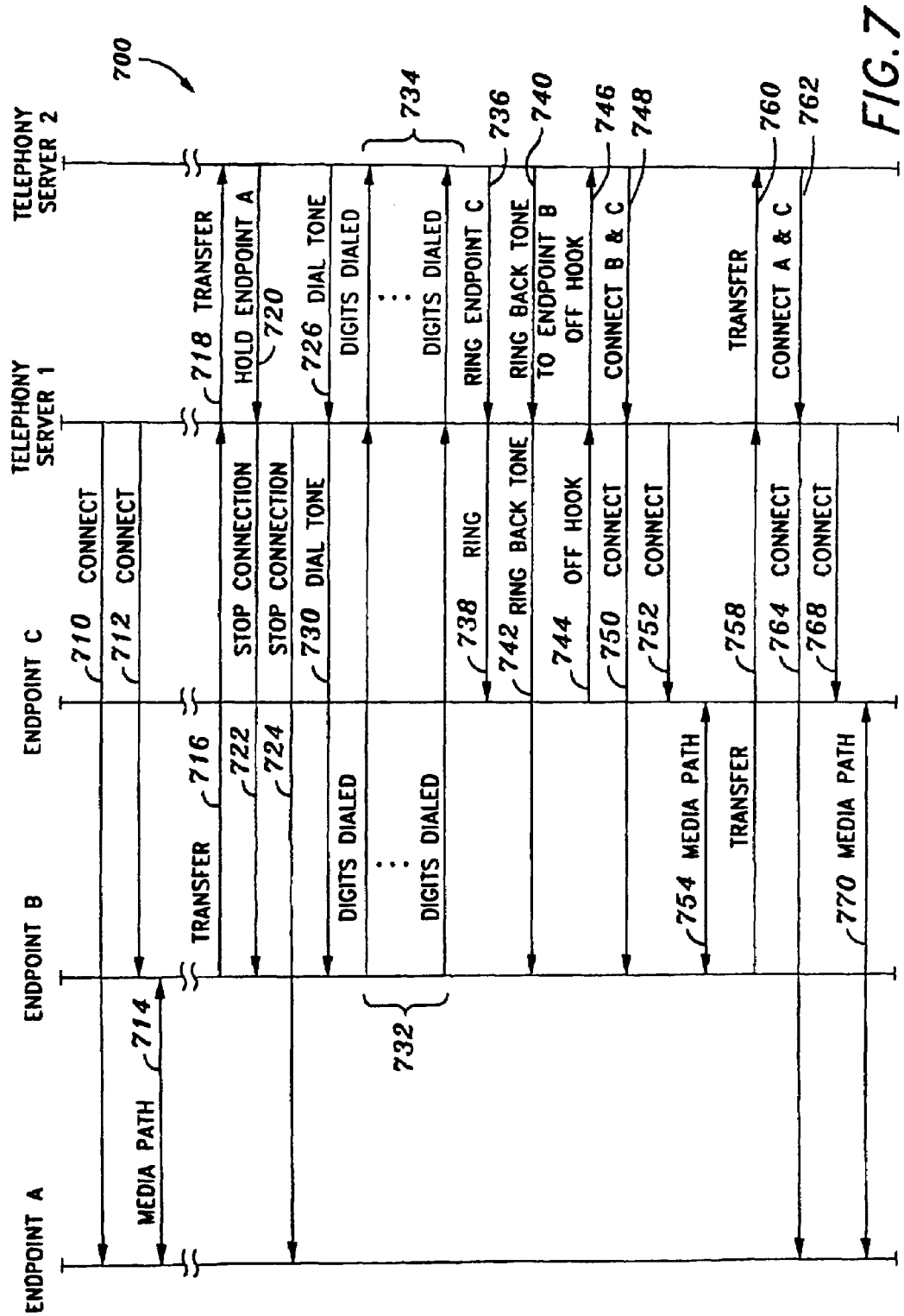

MULTI-MODE ENDPOINT IN A COMMUNICATION NETWORK SYSTEM AND METHODS THEREOF

BACKGROUND OF THE INVENTION

1. Field of the Invention

The present invention relates generally to the field of communication networks. Specifically, the present invention relates to a method, an apparatus, and a communication network system having multiple communications endpoints where each endpoint may be simultaneously registered with more than one communications server.

2. Background Information

The most basic and, today, necessary form of communication is the telephone. Through the telephone, many forms of "information" can be transmitted including voice, data, facsimile, video, and combinations thereof. Traditionally, telephone service is provided to end users through a dedicated switch. In a residential application, the end user's telephone is connected to the telephone company's central office switch via a dedicated telephone line. In a business application, where a large number of telephone lines are required, the organization typically sets up a private network on its premises. This private network is called a Private Branch Exchange (PBX). The PBX is connected to the telephone company's central office by way of dedicated lines (e.g., T1 lines). The PBX facilitates intra-organization telephone calls without the need to access the public switched telephone network. Moreover, because of the PBX, the organization can lease less telephone lines to connect the organization's telephones to the public switched telephone network.

However, there are some drawbacks associated with the above-mentioned applications. In both the residential and business applications, the telephone is a slave to the telephone company's master switch or PBX, and cannot bypass such master switch. Therefore, the user is at the mercy and cost structure of the master switch or PBX, and is limited to what communications services the specific master switch or PBX can provide.

Accordingly, it is desirable to provide an apparatus, method, and system that overcomes the aforementioned drawbacks.

SUMMARY OF THE INVENTION

The present invention includes a method, apparatus, and communication network system that allows an endpoint to be simultaneously registered with one or more communication servers. In one embodiment, the communication network system includes a network, a plurality of communication servers that are coupled to the network:, and a plurality of endpoints coupled to the network. An endpoint may include one or more logical lines where, in one embodiment, the logical lines are capable of being registered with and directly controlled by one or more communication servers. This allows the endpoint to have more than one master (communication server) independently of each other and irrespective of whether the one or more communication servers are aware of the existence of each other.

Other aspects and features of the invention are described and claimed herein.

BRIEF DESCRIPTION OF THE DRAWINGS

FIG. 1A shows a table of entries for each endpoint in the telephone network system of FIG. 1.

FIG. 3C illustrates a block diagram of a device that integrates a PBX and a telephony server for communication in the telephony network system of FIG. 1, according to yet another embodiment of the present invention.

FIG. 4 shows an exemplary message sequence diagram for connecting a telephone call from one endpoint to another endpoint, according to one embodiment of the present invention.

FIG. 7 illustrates a message sequence diagram for performing collaborative processing between telephony servers in response to a call transfer feature, according to one embodiment of the present invention.

DETAILED DESCRIPTION

The present invention includes a method, apparatus, and communication network system that allows an endpoint to be simultaneously registered with one or more communication servers. In one embodiment, the communication network system includes a network, a plurality of communication servers that are coupled to the network, and a plurality of endpoints coupled to the network. An endpoint may include one or more logical lines where, in one embodiment, the logical lines are capable of being registered with and directly controlled by one or more communication servers. This allows the endpoint to have more than one master (communication server) independently of each other and irrespective of whether the one or more communication servers are aware of the existence of each other.

As described herein "media" or "media stream" is generally defined as a stream of digital bits that represent data, audio, video, facsimile, multimedia, and combinations thereof. An "endpoint" describes an origination and/or termination device for initiating and/or terminating media streams. For example, an endpoint may include a telephone (analog/digital), wireless telephone, computer, pager, and devices that emulate a telephone such as a softphone executing on an information processor. A "communication link" is generally defined as any medium over which information may be transferred such as, for example, electrical wire, optical fiber, cable, plain old telephone system (POTS) lines, wireless (e.g., satellite, radio frequency "RF" infrared, etc.)

and the like. Information is defined in general as media and/or signaling commands. A "communication server" defines a device that allows endpoints to communicate to each other and pass media streams therebetween. One example of a communication server is a telephony server. However, the present invention may be implemented using any type of communication server such as a multimedia server, information server, etc.

Figure 1:
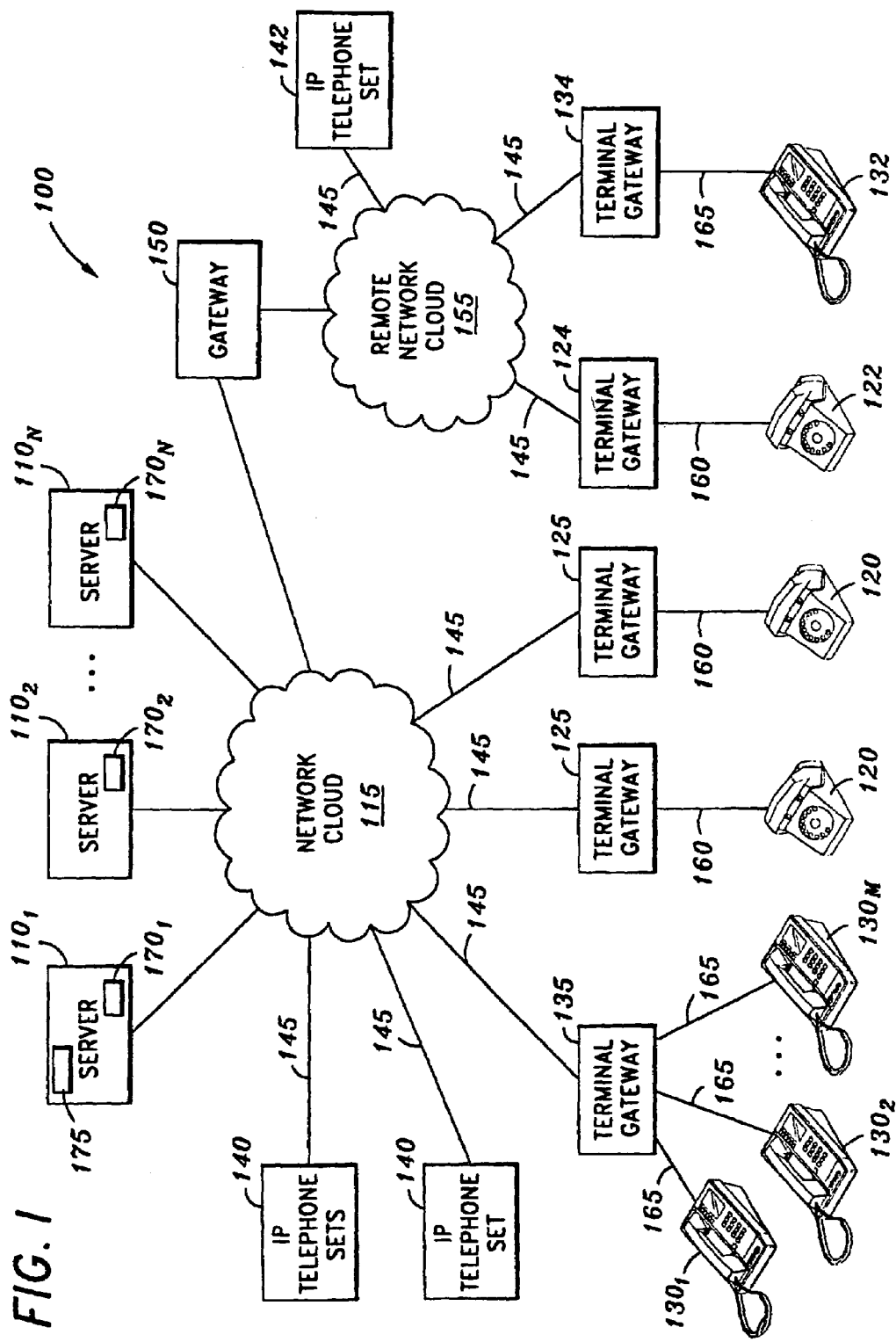
FIG. 1 illustrates a block diagram of a telephone network system, according to one embodiment of the present invention.

FIG. 1 illustrates a block diagram of a communication network system 100, according to one embodiment of the present invention. For sake of illustration, the system will be described with respect to a telephony network system. The telephone network system 100 of the present invention allows multiple endpoints to simultaneously be registered as valid endpoints on multiple telephony servers without the telephony servers necessarily knowing about each other's existence on the network.

Referring to FIG. 1, the telephony network system 100 includes a plurality of telephony servers $110_1$–$110_N$ ("110") (where "N" is a positive whole number such as one, two, five, etc.) that are coupled to a network cloud 115 (e.g., Internet). The network cloud 115 may include any type of network that can transport packets and/or cells, of information (e.g., signaling commands and media) thereacross. Exemplary networks include, but are not limited or restricted to, Transmission Control Protocol/Internet protocol (TCP/IP), frame relay, asynchronous transfer mode (ATM), and X25 networks.

Each telephony server 110 provides primary telephony services for one or more endpoints including the establishment, supervision, and termination of telephone calls. Each telephony server 110 is capable of providing call processing functions to any other called endpoint in the network cloud 115. Moreover, the telephony servers $110_1$–$110_N$ include corresponding registration tables $170_1$–$170_N$, each of which contains a list of endpoints that are registered with (and receive primary telephone service from) that specific telephony server. A separate table is also maintained for all the endpoints in the telephony network system 100 including information such as the telephone number, logical line number, IP and media access control (MAC) addresses of the terminal gateway that is coupled to each endpoint, etc. The table may be contained as part of one of the telephony servers $110_1$–$110_N$, or may be a stand-alone server. For sake of illustration, the table is contained in telephony server $110_1$, as shown by numeral 175.

To that end, each telephony server 110 includes one or more processors such as Pentium™ based microprocessors, random access memory (e.g., 128 MBs), mass storage, and hardware necessary for accessing the network cloud 115 such as a network interface card. Each telephony server 110 further includes application software for, among other things, (i) providing call manager/processing functions to allow a registered endpoint to place a telephone call and connect to any other endpoint in the network cloud 115, (ii) providing other common communication and telephony features, (iii) communicating with other telephony, multimedia, information, etc. servers in the network system 100, and (iv) accessing a database (e.g., table 175) containing information on each endpoint in the telephony network system 100. The common telephony features include, but are not limited or restricted to, call waiting, conference calling, call transfer, answering services, and the like. The telephony servers $110_1$–$110_N$ may be owned by different entities promoting an open market for communication service providers.

The telephony network system 100 also includes a plurality of endpoints designated by numerals 120,$130_1$–$130_M$ (where "M" is a positive whole number), and 140. Endpoints 120 are conventional analog telephones, endpoints $130_1$–$130_M$ are digital telephones, and endpoints 140 are IP telephones that integrate the function of a conventional telephone with circuitry for converting signaling and media to IP packets, and vice versa. It is to be appreciated that the telephony network system 100 may include any combination of endpoints, as various different implementations of endpoints are shown and described herein for sake of illustration.

Specifically, each endpoint 120 is coupled to a terminal gateway 125 by way of communication link 160. The terminal gateway 125 is in turn coupled to the network cloud 115 via communication link 145. The communication link 160 carries analog signals including media and commands between the endpoint 120 and the terminal gateway 125. Commands include, for example, detecting the telephone going "off-hook"/"on-hook", and detecting DMTF tones (e.g., to dial a telephone number, or pressing "*" followed by one or more digit to request a function such as call forwarding). The communication link 145 between the terminal gateway 125 and the network cloud 115 carries IP packets in the form of media and commands.

Thus one function of terminal gateway 125 includes converting IP media packets received over the network cloud 115 to analog signals and forwarding the analog signals to the endpoint 120, and vice versa. Other functions of the terminal gateway 125 include detecting and processing commands received from endpoint 120, digitizing, packetizing and transmitting the commands to a telephony server, processing commands received from the telephony server, and providing call progress features to endpoint 120 (e.g., dialtone, ringback tone, busy signal, etc.), in response to the command received from the telephony server. Accordingly, two types of IP packets are transmitted and received over the network cloud 115. These include signaling packets (also referred to as messages), which are commands that are passed between the terminal gateway 125 and a telephony server and/or between two terminal gateways, and media packets that include audio, video, data, facsimile, and combinations thereof, which are transmitted between endpoints, either on the network cloud 115 or on different network clouds.

Each terminal gateway 125 includes a coder/decoder (CODEC), implemented either in hardware or software, which converts (e.g., 8 kHz sample rate) analog signals received from the endpoint 120 into a digital stream, and vice versa. The terminal gateway 125 further includes conventional packetizers for packaging the digital bits in the digital stream into packets for transmission, and unpackaging packets received from the network cloud 115 into a digital stream. The packaging and unpackaging of packets may be done in software or by dedicated hardware as is well-known in the art. The terminal gateway 125 is able to discern between commands issued by the endpoint 120 and media, and act upon such information accordingly.

Digital telephone endpoints $130_1$–$130_M$ are coupled to a terminal gateway 135 by way of separate communication links 165. The terminal gateway 135 is then coupled to the network cloud 115 via communication link 145. The digital telephones $130_1$–$130_M$ may be of the type typically sold by Lucent Technologies, Nortel Networks, and the like. Thus, in one embodiment, the digital stream on signal lines 165 may be of different protocols depending on the digital telephone being used. Therefore, the terminal gateway 135 may be compatible with a number of varying protocols used by the digital telephones. In one protocol the digital bit stream may include one or more data channels for transmitting media, and a signaling channel for transmitting commands between the terminal gateway 135 and the endpoint 130. The terminal gateway 135 communicates with the telephony servers via communication link 145 using; a variety of protocols including, for example, session initiation protocol ("SIP"), H.323 entitled "Visual Telephone Systems and Equipment for Local Area Networks Which Provide a Non-guaranteed Quality of Service", version 1, published November, 1996, Media Gateway Control Protocol ("MGCP") [referred to as H.248], and other open or encapsulated proprietary protocols.

Endpoints 140 are directly connected to the network cloud 115 via communication links 145. Endpoints 140 are IP telephones that integrate the function of a conventional telephone with circuitry for converting analog signals to a digital bit stream, and the digital bit stream to IP packets. That is, each IP telephone 140 includes a telephone and a terminal gateway.

Each terminal gateway in the telephony network system 100 includes a table (not shown) that contains the telephone number(s) of each endpoint that is connected to the terminal gateway, the logical line number(s) of the endpoint, the port of the terminal gateway that the endpoint is connected to, the IP and MAC addresses of the telephony server(s) that each endpoint is registered with, the features supported, protocols utilized, and other information. In the case of IP telephone 140, the table is contained therein.

The telephony network system 100 further includes a gateway 150 coupled to the network cloud 115. The gateway 150 provides access to a remote network cloud 155 which may include a remote wide area network (WAN), local area network (LAN), public switch telephone network (PSTN), or combinations thereof. Coupled to the remote network cloud 155 are a number of endpoints such as, for example, analog endpoint 122 via terminal gateway 124, digital endpoint 132 via terminal gateway 134, IP endpoint 142, and telephony servers (not shown). More than one gateway 150 may coexist to allow access to a number of remote network clouds. The gateway allows endpoints on the network cloud 115 to access endpoints on the remote network cloud 155. The gateway 150 includes, among other things, a signaling gateway function (e.g., using MGCP [H.248]), a media gateway function, and a gatekeeper function. The gatekeeper function maintains a table with the IP addresses of endpoints on both the network cloud 115 and the remote network cloud 155, and provides registration, admission, and status information for telephone calls therebetween. Additionally, the gateway 150 includes a transcoding function to convert one type of encoding protocol (e.g., G.729 on network cloud 115) to another type of encoding protocol (e.g., G.711 for PSTN on network cloud 155).

Each endpoint in the telephony network system 100 includes one or more telephone numbers, where each telephone number may be assigned one or more logical lines. Thus, an endpoint with a single telephone number can have, for example, two logical lines. Each logical line represents a telephone line. Additionally, the logical lines of an endpoint may be registered with different servers. For example, in the case of a travel agent, a first logical line may be registered with a first telephony server (owned by a first airline) while a second logical line may be registered with a second telephony server (owned by a second airline). Alternatively, the travel agent may have two separate telephone numbers registered with the two respective telephony servers. In this system, it is entirely possible that the second telephony server may be unaware of the existence of the first telephony server or that the endpoint has two logical lines that are registered with the two servers. A telephone set may have a first button/key that is mapped to a first telephony server, and other buttons/keys that are mapped to one or more other telephony servers.

Consequently, an endpoint may simultaneously be registered with more than one telephony server. Since an endpoint in the telephony network system 100 is capable of being registered with one, two, three, four, or more telephony servers, at the same time, each endpoint is capable of exhibiting a multi-mode behavior. That is, an endpoint is capable of logically appearing as more than one endpoint to the more than one respective telephony servers that the endpoint is registered with. An endpoint may also simultaneously appear to exist as a valid endpoint to and receive telephone calls from more than one telephony server. This configuration lends itself to an exemplary scenario where an endpoint, while on a telephone call established via a first telephony server, can receive a :second telephone call from a second telephony server (see, e.g., FIGS. 4 and 5).

Referring now to FIG. 1A, an exemplary embodiment of table 175 may be seen. As shown therein, table 175 includes an entry 180 for each logical line of each endpoint in the telephony network system 100. Entry 180 includes a plurality of fields including (i) field 182 which contains the telephone number and logical line number of an endpoint, (ii) field 184 containing the IP and MAC addresses of the terminal gateway coupled to the endpoint, or, in the case of IP telephones 140, the endpoint itself, (iii) field 186 containing the IP and MAC addresses of the telephony server that the telephone and logical line numbers of the endpoint is registered with, (iv) field 188 containing the protocols utilized by the endpoint (e.g., message protocol, compression, etc.), (v) field 190 containing features available for the endpoint (e.g., call waiting, call forwarding, etc.), (vi) field 192 containing the email address of the endpoint, if any, and (vii) field 194 containing other miscellaneous information about the endpoint. Thus, as each logical line of an endpoint is registered with a telephony server, the registering telephony server, in addition to adding this information to its registration table, updates table 175 by forwarding a message to the server that maintains table 175.

In one embodiment, the email address in field 192 may be used in lieu of a telephone number to call an endpoint. A user at a first endpoint can connect to a second endpoint using only the email address of the second endpoint. The telephony server that the first endpoint is registered with uses the email address to find, in table 175, the MAC and IP addresses of the terminal gateway attached to the second endpoint.

Figure 2:
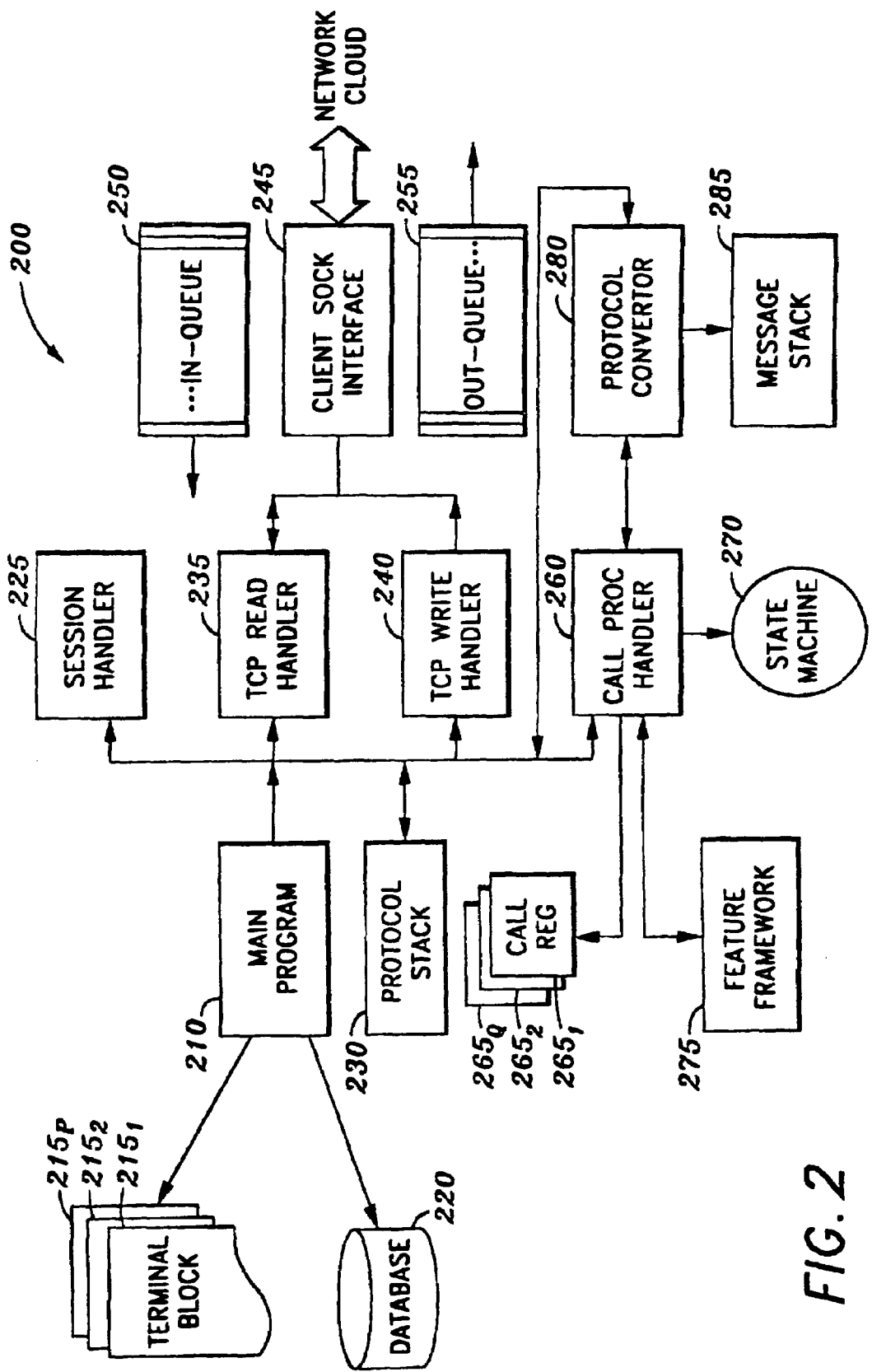
FIG. 2 illustrates a software block diagram of a server application program operating on a telephony server, according to one embodiment of the present invention.

FIG. 2 illustrates a software block diagram of a server application program 200 operating on a telephony server, according to one embodiment of the present invention. The server application program 200 may operate on any type of operating system including, for example, the Windows 95, Windows 98, Windows NT operating systems or other proprietary or open operating systems.

Referring to FIG. 2, the server application program 200 includes a main program module 210, a plurality of terminal blocks $215_1$–$215_P$ (where "P" is a positive whole number), and a database 220. The database 220 contains data about each endpoint that is registered with the telephony server and is stored on mass storage. In one embodiment, the database 220 is created/modified by a separate graphical user interface application program (not shown) Each terminal block 215 is a data structure that is maintained for each endpoint that is registered with the telephony server, and contains the endpoint telephone and logical line numbers, the MAC and IP addresses of the terminal gateway connected to the endpoint, the protocols and features supported (e.g., call waiting, call forwarding, etc.) by the endpoint and terminal gateway, telephone key map of the endpoint, and other capabilities and configuration information. The table 175 (FIGS. 1 and 1A) can be created from the database 220 if the table was contained in the telephony server.

The main program module 210 executes during initialization and initializes the telephony server, reads data from the database 220, and builds the terminal blocks $215_1$–$215_P$ for the plurality of registered endpoints. In addition, during initialization, a session handler module 225, TCP Read handler module 235, TCP write handler module 240, and call processing handler module 260 are created.

The protocol stack module 230 provides a set of protocols that are used by the endpoints. That is, since there may be a variety of endpoint types, and thus, a variety of protocols for transmitting and receiving messages, the protocol stack module 230 maintains the set of protocols. Exemplary protocols include, among others: SIP, H.323, MGCP [H.248], Megaco, and other open or proprietary digital telephone protocols. The protocol stack module 230 forms outgoing messages to endpoints utilizing the protocol(s) of the endpoints and parses incoming messages from endpoints.

The TCP read handler 235 reads incoming messages from the network cloud 115 using a client socket interface module 245. The client socket interface module 245 provides a set of application program interfaces (APIs) or function calls, which in turn use available socket libraries. The TCP read handler 235 monitors the client socket interface module 245 and accepts the incoming connection from the endpoints. The incoming messages are placed in an input queue 250. The input queue 250 is broken up into a session message queue and one or more call processing message queues. The TCP read handler 235 reads the header of messages, and places session messages in the session queue, and places call processing messages in the call processing message queue(s), as will be described in more detail below. The TCP write handler 240 de-queues messages in an output queue 255 and sends the packets to the network cloud 115 using the client socket interface module 245.

The session handler module 225 registers and authenticates the terminal gateways with the server. The terminal gateway or IP telephone set registers with the telephony server via the session handler module 225. The session handler module 235 reads incoming session messages from endpoints and provides the session and connection handling capabilities of the server. All the session messages from the endpoints are processed using a session state and the required output is sent to the endpoints using the TCP write handler 240. Session messages include, among other things, the MAC and IP address of the terminal gateway, the telephone and logical lines numbers of the endpoint: that is coupled to the terminal gateway, the protocol used by the terminal gateway, the compression algorithm utilized (e.g., G.711, G.729, etc.), if any, and other configuration information.

The call processing handler 260 is the heart of the application program 200, providing all the call processing functionalities for providing telephony service to endpoints. The call processing handler 260 receives call processing messages from the TCP read handler 235 and sends call processing messages to the TCP write handler 240 for transmission. The call processing functionalities include, among other things, providing a dialtone message in response to receiving an off-hook message, providing ring and ringback messages to the source and destination endpoints of the telephone call, etc. The call processing handler 260 uses and maintains a state machine 270 for each call. The state machine 270 provides various states of a call, allowing the handler 260 to process incoming messages and generate outgoing messages in response to the state of the call. The basic states include IDLE, DIALING, RINGING, and ACTIVE. The handler 260 also maintains call register data structures $265_1$–$265_Q$ (where "Q" is a positive whole number) on a per call basis. When an endpoint goes off-hook, the call processing handler 260 allocates a call register data structure 265 and links the data structure to the corresponding terminal block 215. The call register data structure 265 contains dynamic call related information including the IP and MAC addresses of the source and destination terminal gateways (or IP telephones), the telephone and logical line numbers of the endpoints, the state of the call, the available features for the calling and/or called endpoints, etc.

The call processing handler 260 is coupled to a feature framework module 275 which maintains a list of features supported by the telephony server. The features include the various call processing features such as call waiting, call forwarding, voice mail, etc. supported.

The call processing handler 260 also terminates/originates messages from/to other telephony servers and gateways (e.g., gateway 150 of FIG. 1). For example, if an endpoint requests a feature that the telephony server does not offer (such as call transfer), the call processing handler 260 sends a message to another telephony server that does provide such feature, if any, and requests assistance. Consequently, each telephony server optionally includes a table that contains a list of other telephony servers and the features that the other telephony servers provide together with their MAC and IP addresses and other information (e.g., protocol of the server).

The call processing handler 260 is coupled to a protocol converter 280 which provides a gateway from the telephony server to other telephony servers or media gateways (see FIG. 1). The protocol converter 280 converts messages from the telephony server to other message formats according to the protocol being used by the destination telephony server or media gateway, and vice versa. A message stack 285 is utilized to queue incoming and outgoing messages. If the destination telephony server or media gateway uses a similar protocol as the originating telephony server, then no conversion is necessary. In either case, the protocol converter 280 forwards messages to the TCP write handler 240 for transmission, and accepts incoming messages from the TCP read handler 235.

Figure 3A:
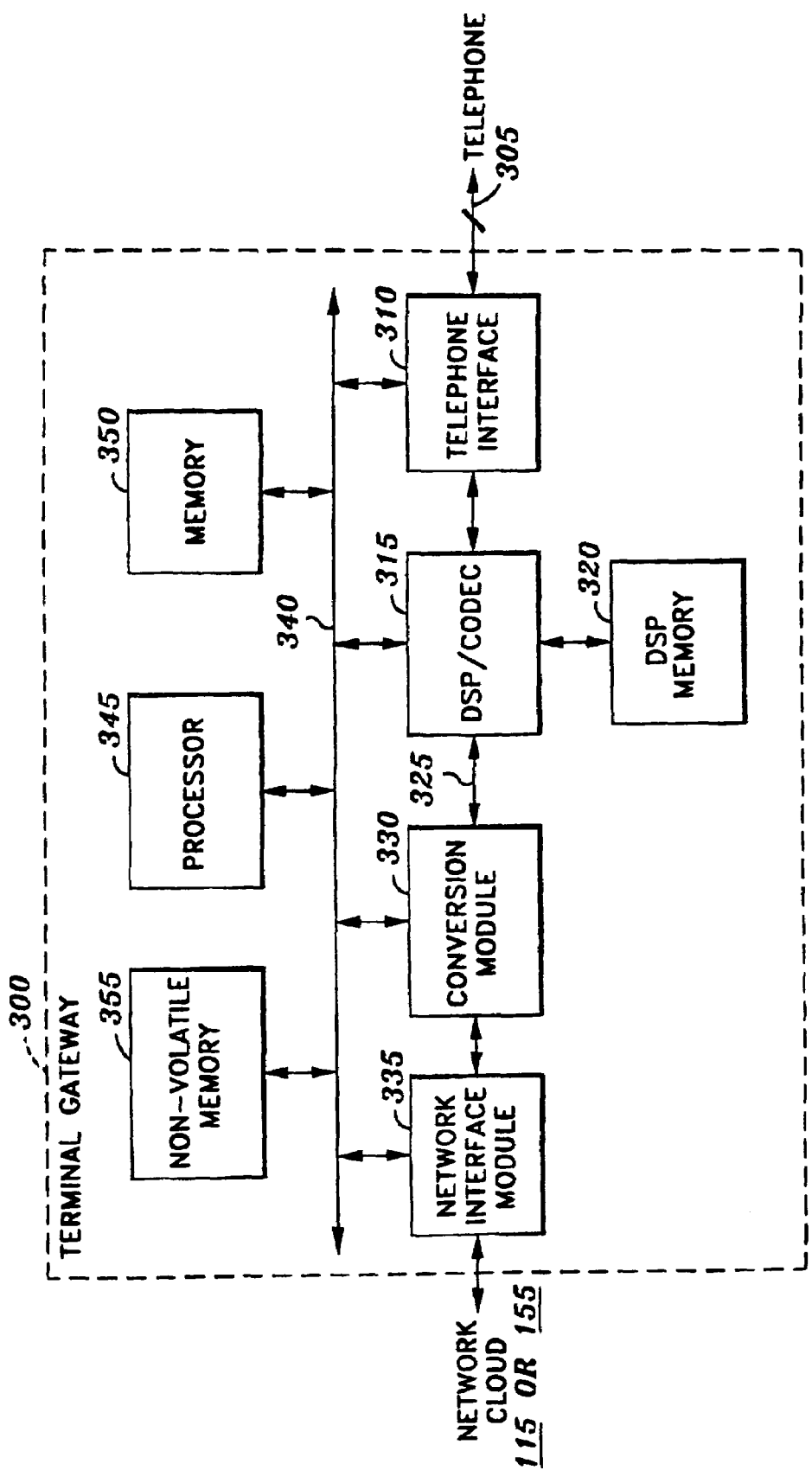
FIG. 3A illustrates a block diagram of a terminal gateway, according to one embodiment of the present invention.

FIG. 3A illustrates a block diagram of a terminal gateway 300, according to one embodiment of the present invention. The terminal gateway 300 exemplifies a terminal gateway for coupling to one or more analog telephones such as terminal gateway 125 (FIG. 1), or to one or more digital telephones such as terminal gateway 135 (FIG. 1).

Referring to FIG. 3A, The terminal gateway 300 includes a telephone interface 310 for coupling to an endpoint by way of communication link 305. If the endpoint is an analog telephone or equivalent, the telephone interface 310 is an analog telephone interface, as is well known in the art. If the endpoint is a digital telephone or equivalent, the telephone interface 310 is a digital telephone interface such as a time compression multiplexing (TCM) interface, as is also known in the art. In either case, the telephone interface 310 is coupled to a digital signal processor (DSP)/CODEC 315. In the case of media or media streams, the DSP/CODEC 315 converts analog signals into a digital bit stream on bus 325 (in the case of an analog interface), or converts a digital input into a digital bit stream on bus 325 (in the case of a digital interface) using one of a number of compression algorithms. The DSP/CODEC 315 is coupled to DSP memory 320 which is used for temporarily storing data. The digital bit stream on bus 325 is received by a conversion module 330, which converts the bit stream into packets, cells, etc. depending on the format selected by the terminal gateway 300. The packets, cells, etc. generated by the conversion module 330 are fed to a network interface module 335. The network interface module 335 includes input/output first-in first-out devices (FIFOs), a transceiver, and timing circuits for transmitting packets, cells, etc. on the network cloud. Packets, cells, etc. received from the network cloud propagates in the opposite direction. In the case of media, the packets, cells, etc. propagate through the conversion module 330, DSP/CODEC 315, telephone interface 310, and to the appropriate endpoint.

The terminal gateway 300 includes a processor or microcontroller 345, memory 350, and non-volatile memory 355 (such as EEPROM, flash, etc.), all of which are coupled to a bus 340. The telephone interface 310, DSP/CODEC 315, conversion module 330, and network interface module 335 are also coupled to the bus 340. The processor 345 detects an off-hook signal from the telephone interface 310. The processor 345 also sends commands to the telephone interface 310 to control various devices on the endpoint(s) such as message lights, etc. The non-volatile memory 355 includes the terminal gateway control software, the telephone and logical line numbers of endpoints that are connected to the terminal gateway, the port that each logical line is connected to, the MAC and IP addresses of the registering telephony server for each logical line, the protocol and features supported, etc.

The processor 345 controls the terminal gateway 300. More specifically, the processor 345 controls the compression algorithm to be used by the DSP/CODEC 315, the protocol of the media, etc. The memory 350 includes endpoint and server message stacks for messages received over the telephone interface 310 and the network interface module 335. The processor 345 parses messages in the message stacks, and generates messages to be transmitted to the telephone interface 310 and the network interface module 335. The DSP/CODEC 315 and/or telephone interface 310 forward signaling messages or commands received from the endpoint(s) to the endpoint message stack (e.g., off-hook, dialing, pressing transfer key, etc.) for processing by the processor 345. The processor 345 also sends commands to the DSP/CODEC 315 and/or telephone interface 310 for providing call processing functions to the endpoint (e.g., dialtone, ring, ringback, busy, etc.). The network interface module 335 and/or conversion module 330 forward messages received from telephony servers to the server message stack for processing by the processor 345 (e.g., dialtone message). The processor 345 sends messages to the conversion module 330 and/or the network interface module 335 for transmission to the telephony servers (e.g., off-hook message).

Figure 3B:
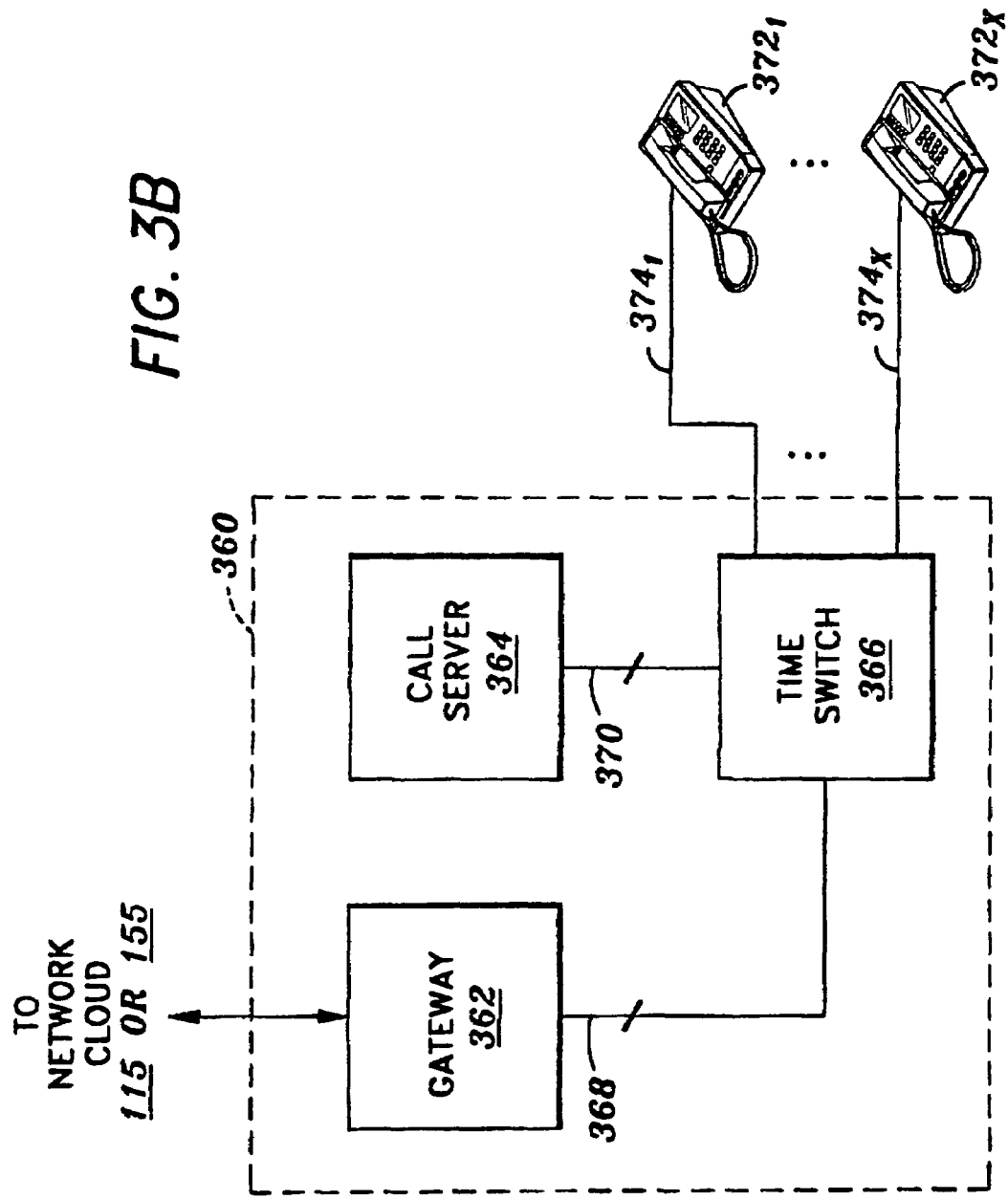
FIG. 3B illustrates a block diagram of a terminal gateway implementing a private branch exchange for communication in the telephony network system of FIG. 1, according to another embodiment of the present invention.

FIG. 3B illustrates a block diagram of a terminal gateway 360 implementing a private branch exchange for communication in the telephony network system 100 of FIG. 1, according to another embodiment of the present invention. The terminal gateway 360 provides compatibility between legacy PBXs, which are switching systems (e.g., time division multiplexing "TDM" switches), and the telephony network system, which is a packet or cell based system.

Referring to FIG. 3B, the terminal gateway 360 includes gateway 362, a call server 364, and a time switch 366, of which the latter two typically represent a PBX. The gateway 362 is substantially similar to the terminal gateway 300 of FIG. 3A, and transmits and receives IP packets and/or cells over the network cloud 115 or 155. The gateway 362 converts IP packets, and/or cells into a synchronous digital bit stream, which is fed to the time switch 364 via digital trunk line(s) 368. Each digital trunk line 368 carrier one or more channels or telephone calls. The time switch 366 is controlled by the call server 364 via lines 370, and routes calls to a plurality of endpoints $372-372_x$ (e.g., digital endpoints) via corresponding communication lines $374_1-374_x$. In one embodiment, each communication line 374 carries a synchronous digital stream. The call server 364 is a legacy call server that controls the time switch 366 and the state of the calls, maintaining, a state machine for each endpoint connected to the time switch 366.

The gateway 362 maintains a table containing information about endpoints $372_1-372_x$. Such information includes the telephone number and logical line number of the endpoint, the port of the time switch 366 that the endpoint is coupled to, the protocols and features supported for each endpoint, and other registration, and configuration information.

FIG. 3C illustrates a block diagram of a device 380 that integrates a PBX and a telephony server for communication in the telephony network system 100 of FIG. 1, according to yet another embodiment of the present invention. Components labeled with like numbers as those in FIG. 3B have similar functionality.

Referring to FIG. 3C, the device 380 includes the features of the terminal gateway 360 of FIG. 3B in addition to the functionality of a telephony server. The addition of block 382 allows the device 380 to provide telephony service not only to endpoints $372_1-372_x$ that are directly attached to the device 380, but also to other endpoints in the telephony network system 100 of FIG. 1. Thus, endpoints $372_1-372_x$ are registered with the local telephony server 382, and can originate telephone calls to other endpoints without the need to access a remote telephony server for telephony service. Additionally, the telephony server 382 can also register other endpoints in the telephony network system 100 of FIG. 1. In this embodiment, the gateway 362 has the added functionality of determining and forwarding messages to the telephony server 382 from other terminal gateways and telephony servers.

FIG. 4 shows an exemplary message sequence diagram 400 for connecting a telephone call from one endpoint to another endpoint, according to one embodiment of the present invention. The diagram 400 shows two endpoints, endpoint A and endpoint B, and a telephony server. Endpoints A and B may be any two endpoints in FIG. 1. With respect to this message sequence diagram only, an endpoint refers to the combination of a telephone (analog or digital) and a terminal gateway.

Referring to FIG. 4, a call is initiated when endpoint A goes off hook. The terminal gateway attached to (or integrated within) endpoint A (referred to as "terminal gateway A") detects the endpoint is off hook, and sends an off hook command together with the telephone and logical line numbers of endpoint A, the MAC and IP addresses of terminal gateway A, and other information to the telephony server, as shown by arrow 410. The telephony server then issues a dialtone command to terminal gateway A, as shown by arrow 415. Terminal gateway A then provides a dialtone to endpoint A. Endpoint A then dials digits (e.g., telephone number of endpoint B) which are either forwarded by the terminal gateway A to the telephony server in real time or in predetermined time intervals, as shown by arrow 420. The telephony server searches for the MAC and IP addresses in its registration table (e.g., table 170 of FIG. 1) corresponding to the telephone number dialed.

If the information appears in its registration table, then the MAC and IP addresses of the destination terminal gateway are determined from the telephone number. However, if there is no match in its registration table, the telephony server queries the table 175 (FIG. 1A) for the necessary information. The table 175 may be contained on the same telephony server, on a different telephony server, or as a stand-alone unit. In either case, the telephony server sends a ring message, using the MAC and IP addresses obtained from the table, to the terminal gateway attached to endpoint B (referred to as "terminal gateway B"), as shown by arrow 425. Terminal gateway B then provides a ring; signal to endpoint B. At substantially the same time, the telephony server sends a ringback message to terminal gateway A, which generates a ringback signal to endpoint A, as shown by arrow 430.

Once endpoint B goes off hook, terminal gateway B detects the off hook, and forwards an off hook message to the telephony server, as shown by arrow 435. The telephony server then transmits a connect message together with the MAC and IP addresses of terminal gateway B, the supported protocols, etc. to terminal gateway A, as shown by arrow 440. Similarly, the telephony server transmits a connect message together with the MAC and IP addresses of terminal gateway A, the supported protocols, etc. to terminal gateway B, as shown by arrow 445. Using the MAC and IP addresses, terminal gateways A and B use a transport layer protocol to connect to, establish a media path, and transfer media streams between the endpoints, as shown by arrow 450. In one embodiment, the terminal gateways use real-time transport protocol (RTP), as defined by RFC 1889, entitled "RTP: A Transport Protocol for Real-Time Applications", and RFC 1890, entitled "RTP Profile for Audio and Video Conferences with Minimal Control", both of which were published in 1995, for transferring media streams between the endpoints. However, other protocols may be used for transporting media between the endpoints.

Figure 5:
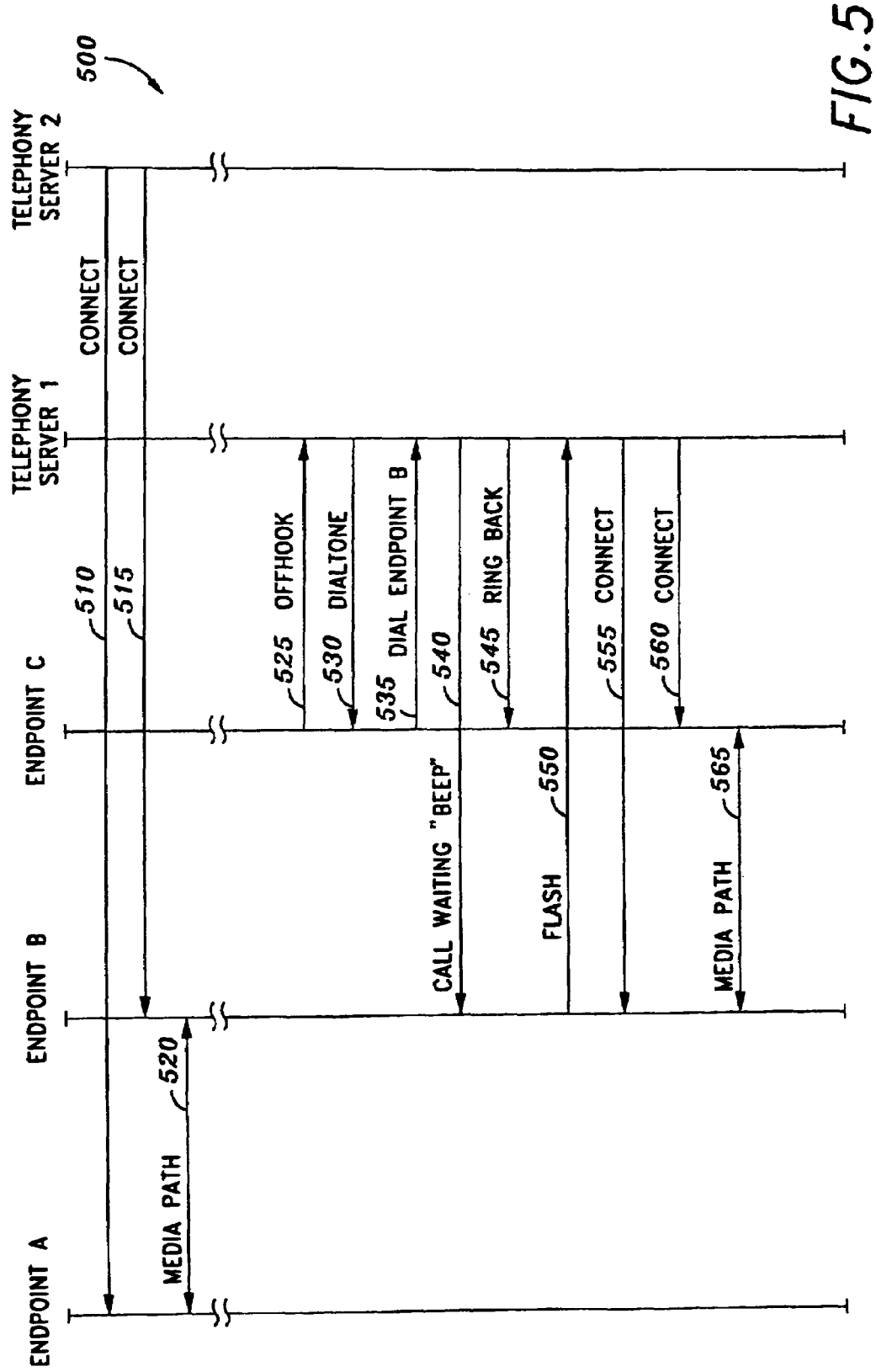
FIG. 5 shows a message sequence diagram for connecting a telephone call from a first endpoint to a second endpoint, while the second endpoint is on a telephone call with a third endpoint, according to one embodiment of the present invention.

FIG. 5 shows a message sequence diagram 500 for connecting a telephone call from a first endpoint to a second endpoint, while the second endpoint is on a telephone call with a third endpoint, according to one embodiment of the present invention. Referring to FIG. 5, the message sequence diagram 500 shows telephony server 2 sending connect commands to endpoints A and B (arrows 510 and 515), which causes the endpoints to connect together, and establish a media path therebetween, as shown by arrow 520. At some point thereafter, endpoint C goes off-hook in order to place a telephone call. Endpoint C is registered with telephony server 1, and thus the terminal gateway attached to (or integrated within) endpoint C (referred to as "terminal gateway C") detects that endpoint is off hook, and sends an off hook message to telephony server 1, as shown by arrow 525. In response to the off-hook message, telephony server 1 transmits a dialtone message to terminal gateway C, as shown by arrow 530. Terminal gateway C then provides a dialtone to endpoint C.

Endpoint C then dials the telephone number of endpoint B, causing terminal gateway C to forward the telephone number to telephony server 1, as shown by arrow 535. Telephony server 1 searches for the MAC and IP addresses of terminal gateway B in its table or, if no match, in table 175 (FIG. 1). Using the MAC and IP addresses of terminal gateway B, telephony server 1 sends a ring message to endpoint B, as shown by arrow 540. Terminal gateway B provides a ring signal or call waiting "beep" signal to endpoint B. At substantially the same time, telephony server 1 sends a ringback message to terminal gateway C, which generates a ringback signal to the endpoint C, as shown by arrow 545.

Once endpoint B switches over (e.g., by "flashing" over or pressing a button the telephone), terminal gateway B detects the switch over, and transmits an answer message to telephony server 1, as shown by arrow 550. Telephony server 1 then transmits a connect message to terminal gateways B and C, as shown by arrow 555 and 560. Terminal gateways B and C then establish a media path between endpoints B and C (e.g., using RTP), as shown by arrow 565.

As exemplified in FIG. 5, the present invention allows two separate telephony servers to access a single endpoint. Additionally, an endpoint may have two or more logical lines that may be registered with multiple telephony servers. Thus, with the present invention, an endpoint is no longer slave to a particular switch, and may select more than on telephony server as a master. In the prior art, an endpoint is slave to a dedicated switch be it a telephone company's central office switch or a PBX.

The present invention allows an endpoint having more than one telephone number to be registered with more than one telephony server. Thus, an endpoint simultaneously appears to be a valid endpoint to more than one telephony server. In a business environment, this configuration provides numerous advantages. For example, a travel agent of a first airline carrier can receive and originate telephone calls from a first telephony sever (typically owned by the airline carrier) and simultaneously receive and originate telephone calls from a second telephony server via a second telephony server owned by the second airline carrier.

Figure 6:
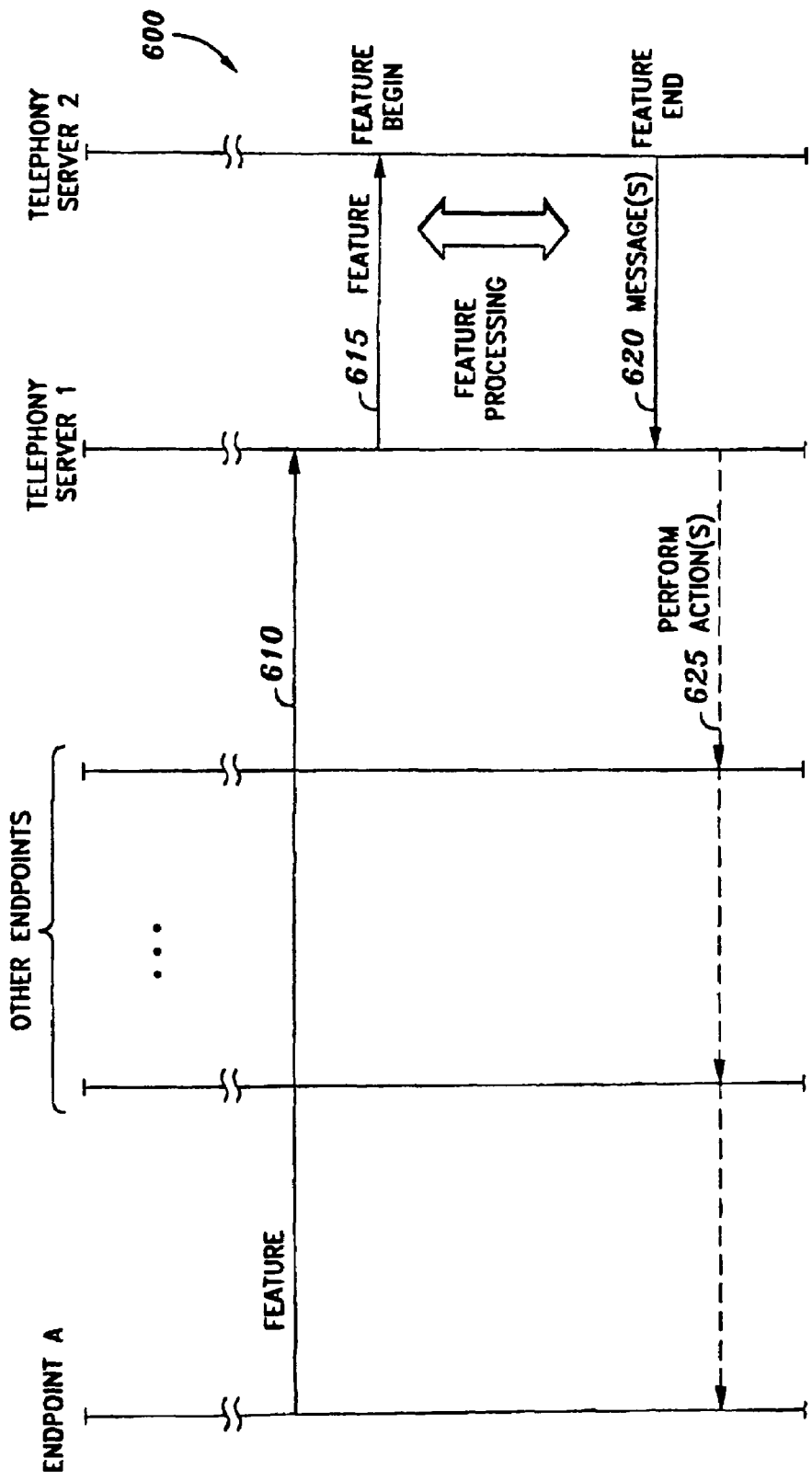
FIG. 6 illustrates a generic message sequence diagram for performing collaborative processing between telephony servers in the telephony network system of FIG. 1, according to one embodiment of the present invention.

FIG. 6 illustrates a generic message sequence diagram 600 for performing collaborative processing between telephony servers in the telephony network system of FIG. 1, according to one embodiment of the present invention. Referring to FIG. 6, a user at endpoint A selects a feature, as shown by arrow 610. The feature may be selected at any time. For example, the feature may be selected when the user picks up the handset at endpoint A and receives a dialtone, or when the user is on a telephone call with another endpoint. The features may be mapped to specific keys on the endpoint such that when a key is pressed, the message corresponding to the key is sent to a telephony server via the terminal gateway attached to the endpoint. There may be numerous features available to the user at endpoint A such as, for example, speed dialing, call waiting, conference calling, call forwarding (e.g., all calls, no answer, busy), call transfer, call pickup, attendant features, automatic call distribution, call detail recording, ring again, and dozens of other well-known features. Once the feature is selected, the terminal gateway attached to (or integrated within) endpoint A (referred to as "terminal gateway A") detects the feature selected, and, responsive thereto, sends a message corresponding to the feature detected to telephony server 1, as shown by arrow 610.

Telephony server 1 receives the message and then attempts to process the message, and provide support thereof. However, not every telephony server in the telephony network system 100 supports each and every feature.

For example, one telephony server may support 100 features while another telephony server may support 120 features, of which 80 features may be common. A telephony server may agree beforehand with one or more other telephony servers to provide support for features not supported by the one or more other telephony servers, and vice versa. Alternatively, feature support may be requested on the fly. Telephony server 1 may maintain a table containing a list of contracted telephony servers and the features supported by those telephony servers.

Thus, if telephony server 1 does not support or understand the feature requested, telephony server 1 collaborates with another telephony server (hereinafter referred to as telephony server 2) in the telephony network system 100 of FIG. 1, in accordance with the teachings of the present invention. That is, telephony server 1 sends a message to telephony server 2, as shown by arrow 615 requesting support for the feature. Telephony server 2 receives and processes the message. If telephony server 2 also does not support the feature, then a "not supported feature" message is sent back to telephony server 1. Telephony server 1 may then send the message to other telephony servers. Assuming telephony server 2 has the logic to support the feature, telephony server 2 performs feature processing, which involves identifying the actions to be taken for this feature. Telephony server 2 then sends one or more messages, as shown by arrow 620, to telephony server 1 instructing the latter the actions to be taken. In response, telephony server 1 performs the one or more actions required to support the feature, as shown by arrow(s) 625. Telephony server 1 may send messages to the originating endpoint, terminating endpoint(s), both, or other endpoints depending on the feature. Telephony serve 2 may send all messages to telephony server 1 at once for performing the necessary actions. Alternatively, telephony server 2 may send one or more messages at a time, wait for responses back from telephony server 1, send more messages, and so on, in essence treating telephony server 1 as a slave for support the feature.

FIG. 7 illustrates a message sequence diagram 700 for performing collaborative processing between telephony servers in response to a call transfer feature, according to one embodiment of the present invention. Referring to FIG. 7, the message sequence diagram 700 shows telephony server 1 sending connect messages to endpoints A and B (arrows 710 and 712), causing endpoints A and B to establish a media path therebetween, as shown by arrow 714. At some point thereafter, endpoint B presses a "call transfer" key on the endpoint for transferring the call from endpoint A to endpoint C, as shown by arrow 716. The terminal gateway attached to endpoint B (hereinafter referred to as "terminal gateway B") detects the "call transfer" key, and sends a message to telephony server 1. Telephony server 1 receives the message, but does not support the "call transfer" feature. Telephony server 1 then forwards the call transfer message to another telephony server (hereinafter referred to as telephony server 2), as shown by arrow 718. Telephony server 2 processes the message, determines that it supports the "call transfer" feature, and confirms that the feature is supported by responding back to telephony server 1 (not shown).

Telephony server 2 then sends telephony server 1 a hold endpoint A message (arrow 720). Telephony server 1, in response, sends stop connection messages to terminal gateways A and B (arrows 722 and 724). Terminal gateways A and B receive the stop connection messages and terminate the transmission of media streams. Telephony server 2 also sends telephony server 1 a dialtone message for endpoint B (arrow 726), which the latter sends to terminal gateway B (arrow 730). Terminal gateway B then gives a dialtone to endpoint B. Endpoint B dials a telephone number of an endpoint (hereinafter referred to as "endpoint C"), as shown by arrows 732. Telephony server 1 receives the telephone number and optionally forwards the telephone number to telephony server 2 (arrows 734). Telephony server 2 then instructs telephony server 1 to ring endpoint C (arrow 736). Telephony server 1 sends a ring message to the terminal gateway attached to or integrated within endpoint C (hereinafter referred to as "terminal gateway C"), as shown by arrow 738. Terminal gateway C then rings endpoint C. Meanwhile, telephony server 2 sends a ringback message to telephony server 1 (arrow 740), causing the latter to forward the ringback message to terminal gateway B (arrow 742). Terminal gateway B then generates a ringback signal to endpoint B. Endpoint C goes off-hook, causing terminal gateway C to send an off-hook message to telephony server 1 (arrow 744), which is forwarded to telephony server 2 (arrow 746).

Telephony server 2, in response to the off-hook message, forwards a connect message (endpoints B and C) to telephony server 1 (arrow 748). Telephony server 1 sends connect messages to terminal gateways B and C (arrows 750 and 752), which establish a media path between endpoints B and C (arrow 754). At some point thereafter in order to complete the call transfer, endpoint B presses the transfer key again or "flashes over", causing terminal gateway B to forward the message to telephony server 1 (arrow 758). Telephony server 1 sends the message to telephony server 2 (arrow 760), causing the latter to reply with a connect endpoints A and C message to telephony server 1 (arrow 762). In response, telephony server 1 sends connect messages to terminal gateways A and C (arrows 764 and 768), which establish a media path between endpoints A and C (arrow 770). Throughout the collaborative processing between the telephony servers, telephony server 1 keeps telephony server 2 apprised of the state of the call processing and feature by routinely forwarding confirmation or other messages to telephony server 2. As can be seen, a telephony server may collaborate with other telephony servers in order to provide features to endpoints not directly supported.

The present invention may be implemented as a method, apparatus, system, software, signal carrier wave, and/or combinations thereof. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a CD-ROM, an optical disk, a hard disk, a fiber optic medium, a radio frequency (RF) link, etc. The computer data signal may include any signal that can propagate over a transmission medium or communication link such as electronic network channels, optical fibers, air, electromagnetic, RF links, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A communications method for an endpoint being one of (i) an Internet Protocol (IP) telephone and (ii) a telephone coupled to a terminal gateway, the communications method comprising:

registering a first line of the endpoint with a first telephony server, and registering a second line of the endpoint with a second telephony server differing from the first telephony server, the first telephony servers registers the endpoint by storing a list identifying endpoints, including the endpoint, in communication with the first telephony server and the second telephony server storing a list identifying endpoints, including the endpoint, in communication with the second telephony server, and at least one of the first and second telephony servers includes information accessible by both the first and second telephony servers and associated with the endpoint, the information including a telephone number, a logical line number, an Internet Protocol (IP) address and a Media Access Control (MAC) address of the endpoint;

establishing a first telephone call on the first line of the endpoint to a second endpoint via the first telephony server; and establishing, a second telephone call on the second line of the endpoint to a third endpoint via the second telephony server.

2. The communications method of claim 1 wherein establishing the second telephone call comprises establishing the second telephone call on the second line of the endpoint to a third endpoint via the second telephony server, without disconnecting the first telephone call on the first line of the endpoint to the second endpoint via the first telephony server.

3. The communications method of claim 1 further comprising receiving a third telephone call on the first line of the endpoint from a fourth endpoint via a third telephony server.

4. The communications method of claim 1 wherein establishing the first telephone call comprises:

sending an off-hook message to the first telephony server in response to detecting the first line going off hook;

receiving a dialtone message from the first telephony server in response to sending the off-hook message;

sending the telephone number of the second endpoint to the first telephony server;

receiving a ring message from the first telephony server to the second endpoint;

receiving a connect message front the first telephony server; and communicating with the second endpoint in response to receiving the connect message.

5. A terminal gateway adapted to convert Internet Protocol (IP) media packets from a network into analog signals and to forward the analog signals to at least one endpoint via a dedicated communication link between the terminal gateway and the at least one endpoint, said terminal gateway comprising:

a memory including one or more instructions; and a processor coupled to the memory, said processor, in response to the one or more instructions, to, establish a first communication path between a first logical line of a first endpoint and a second endpoint, via a first telephony server coupled to the network, in response to a first input, by the first telephony server accessing an Internet Protocol (IP) address and a Media Access Control (MAC) address for the second endpoint from a first registration table stored within the first telephony server, and if not contained in the first registration table, from a table stored within the first telephony server, the table comprises fit a telephone number or the first endpoint, the second endpoint and a third endpoint, (ii) a number associated with the first logical line and a second logical line, (iii) an Internet Protocol (IP) address and Media Access Control (MAC) address of each terminal gateway coupled to the first, second and third endpoints, and (iv) an IP address and a MAC address of the first telephony server, and a second telephony server; and establish a second communication path between their second logical line of the first endpoint and thus third endpoint via a second telephony server coupled to the network, in response to a second input, by the second telephony server accessing an Internet Protocol (IP) address and a Media Access Control (MAC) address for the third endpoint from a second registration table stored within the second telephony server, and if not contained in the second registration table, from the table stored within the first telephony, said second communication path being established via the second telephony server independently of the first communication path.

6. The communications method of claim 5, wherein the information accessible to both the first end second telephony servers includes an electronic mail address of the endpoint.

7. The communications method of claim 5, wherein the information accessible to both the first and second telephony servers includes a field identifying features available to the endpoint including calling waiting and call forwarding.

8. A terminal gateway adapted to convert Internet Protocol (IP) media packets from a network into analog signals and to forward the analog signals to at least one endpoint via a dedicated communication link between the terminal gateway and the at least one endpoint, said terminal gateway comprising:

a memory including one or more instructions; and a processor coupled to the memory, said processor, in response to the one or more instructions, to, establish a first communication path between a first logical line of a first endpoint and a second endpoint via a first telephony server coupled to the network, in response to a first input, by the first telephony server accessing an Internet Protocol (IP) address and a Media Access Control (MAC) address for the second endpoint from a first registration table stored within the first telephony server, and if not contained in the first registration table, from a table stored within the first telephony server, the table comprises (i) a telephone number of the first endpoint, the second endpoint and a third endpoint, (ii) a number associated with the first logical line and a second logical line, (iii) an Internet Protocol (IP) address and Media Access Control (MAC) address of each terminal gateway coupled to the first, second and third endpoints, and (iv) an IP address and a MAC address of the first telephony server, and a second telephony server; and establish a second communication path between the second logical line of the first endpoint and the third endpoint via a second telephony server coupled to the network, in response to a second input, by the second telephony server accessing an Internet Protocol (IP) address and a Media Access Control (MAC) address for the third endpoint from a second registration table stored within the second telephony server, and if not contained in the second registration table, from the table stored within the first telephony server, said second communication path being established via the second telephony server independently of the first communication path.

9. The terminal gateway of claim 5 wherein the terminal gateway comprises at least part of the first endpoint.

10. The terminal gateway of claim 5 wherein the second and third endpoints are, the same endpoint.

11. The terminal gateway of claim 8, wherein the table further comprises an electronic mail address of the endpoint.

12. An endpoint, being one of (i) an Internet Protocol (IP) telephone and (ii) a telephone coupled to a terminal gateway, for coupling to one or more telephony servers, the endpoint comprising:
   a first logical line for registering with a first telephony server through storage of information within the first telephony server, the information includes (1) a first registration table including a list of endpoints including the endpoint registered with the first telephony server and (2) a table accessible by each of the telephony servers, the table includes information, associated with a plurality of endpoints including the endpoint, that comprises (i) a telephone number of the endpoint, (ii) a number associated with the tint logical line, (iii) an Internet Protocol (IP) address and Media Access Control (MAC) address of the terminal gateway coupled, to the endpoint, and (iv) an IP address and a MAC address of the first telephony server, said first logical line capable of receiving communications services from the first telephony server; and
   a second logical line for registering with a second telephony server through storage of a second registration table within the second telephony server including a list of endpoints including the endpoint registered with the second telephony server, said second logical line capable of receiving communications services from the second telephony server.

13. The endpoint of claim 12 wherein the first and second logical lines are mapped in first and second keys tin the endpoint.

14. The endpoint of claim 12, wherein said terminal gateway converting signals representing communications calls on the first and second logical lines to packets on the network, and vice versa.

15. The endpoint of claim 12, wherein the table further comprises an electronic mail address of the endpoint.

16. An endpoint being one of (i) an Internet Protocol (IP) telephone and (ii) a telephone coupled to a terminal gateway the endpoint comprising:
   means for registering a first line with a first telephony servo by storage of information within the first telephony server, the information composes a first registration table including a list of endpoints including the endpoint registered with the first telephony server and a table including information associated with the endpoint including (i) a telephone number of the endpoint, (ii) a number associated with the first line, and (iii) an Internet Protocol (IP) address and Media Access Control (MAC) address of the terminal gateway;
   means for registering a second line with a second telephony server differing from the first telephony server by storage of information within the second telephony server, the information including a second registration table including a list of endpoints including the endpoint registered with the second telephony server; and
   means for establishing a first communications call on the first line via the first telephony server, the first telephony server collaborates with the second telephony server if the first telephony server does not support a requested feature.

17. The endpoint of claim 16 further comprising means for establishing the second communications call on then second line via the second telephony, without disconnecting the first communications call on the first line via the first telephony server.

18. The endpoint of claim 17 wherein said means for establishing the first communications call comprises:
   means for sending an off-hook message to the first telephony server in response to detecting the first line going off hook;
   means for receiving a dialtone message from the first telephony server in response to means for sending the off-hook message;
   means for sending a telephone number of a remote endpoint to the first telephony server;
   means for receiving a connect message from the first telephony server; and
   means for communicating with the remote endpoint in response to said means for receiving said connect message.

19. The endpoint of claim 16, wherein the table further comprises an electronic snail address of the endpoint.

* * * * *